April 15, 1930.  J. QUIGLEY  1,754,334
SURVEYING ROD
Filed May 18, 1928
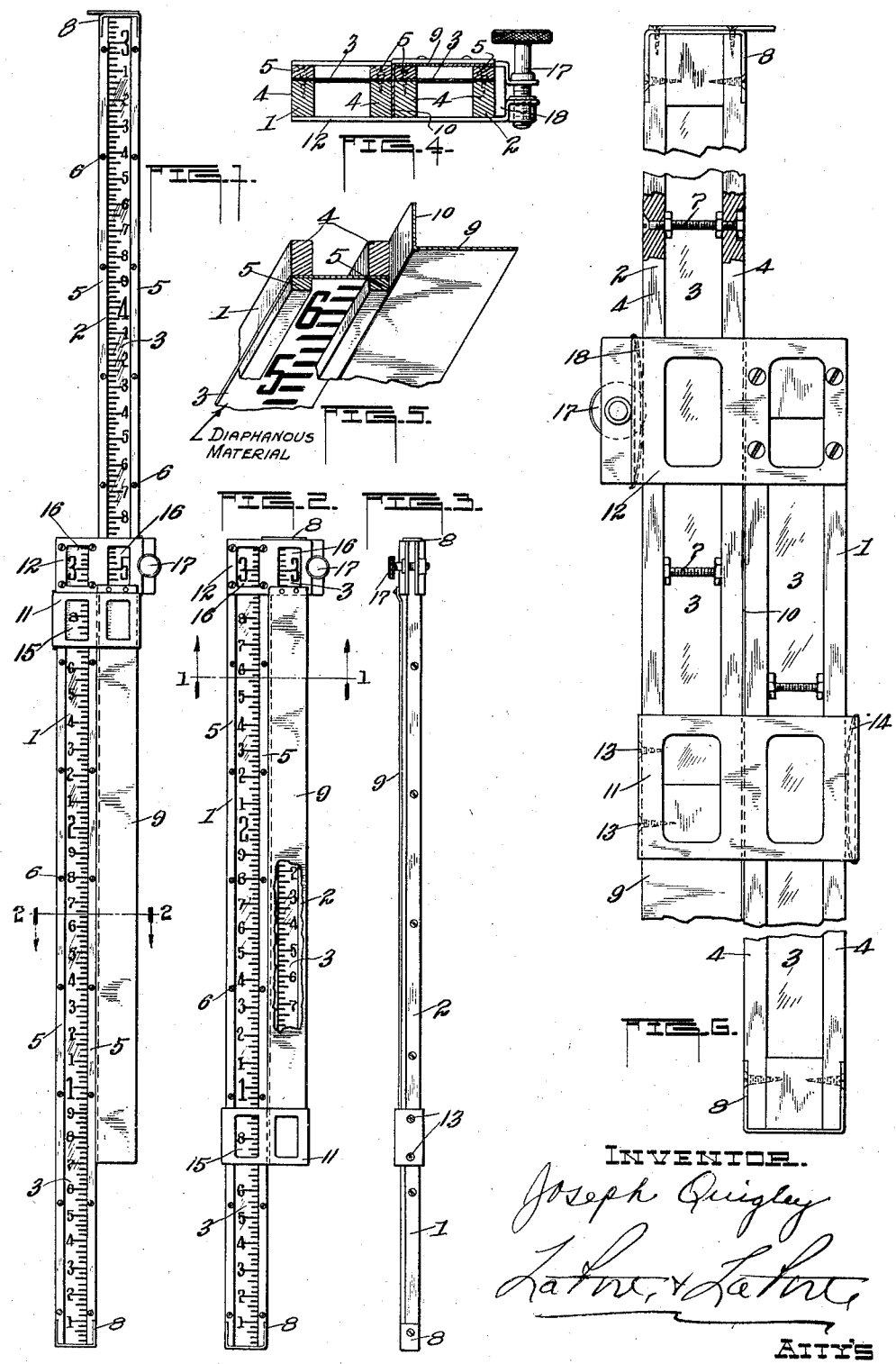

Patented Apr. 15, 1930

1,754,334

UNITED STATES PATENT OFFICE

JOSEPH QUIGLEY, OF NORRIS, ILLINOIS

SURVEYING ROD

Application filed May 18, 1928. Serial No. 278,702.

This invention has reference to surveying rods or staffs adapted for use in determining the forms, dimensions, and levels of portions of the earth's surface.

The principal object of the invention consists in the provision of a surveying rod including one or more diaphanous portions or strips, suitably graduated to present a measuring scale, the diaphanous strips permitting the passage of light therethrough and presenting the graduations or characters on the scale in relief or outline against the light enabling their quick and efficient reading.

The invention has for a further object to provide a surveying rod or staff having two diaphanous scales disposed in juxtaposition with each other, said scales arranged for slidable adjustment along each other.

The invention has for a still further object to provide a surveying rod including two diaphanous graduating scales arranged in juxtaposition with the other, one of said scales arranged for slidable adjustment with the other and associated with a shield adapted to cover the scale from view to render the same non-readable when in non-extended position.

That the invention may be more fully understood, reference is had to the accompanying drawing forming a part of this description and illustrating a preferred embodiment of the invention, in which:—

Fig. 1 is a front view in elevation of my improved rod showing the scale members thereof extended in relation to each other.

Fig. 2 is a view similar to Fig. 1 except the scales are in non-extended relation with a shield covering one of said scales, said shield partly broken away to disclose said scales;

Fig. 3 is an edge view in elevation of Fig. 2;

Fig. 4 is a cross sectional view as the same would appear if taken on the line 1—1, Fig. 2;

Fig. 5 is a cross sectional perspective view as the same would appear if taken on the line 2—2, Fig. 1, and Fig. 6 is an enlarged rear view in elevation, partly broken away, showing in full and dotted lines and in section the arrangement and constructional features thereof.

Like characters of reference denote corresponding parts throughout the figures.

Referring to the drawing, (see Figs. 1, 2 and 3,) my improved surveying rod comprises slidably associated scale members 1 and 2 arranged in juxtaposition with each other, said members including (see Figs. 4 and 6) a strip or tape 3 of diaphanous material, such as linen suitably treated to pass rays of light projected thereon and yet of a character to resist hard wear and weather, said strip being interposed between parallel spaced frame members 4—4 and 5—5, the latter throughout their length, see Figs. 1 and 2, being suitably secured to the former by means of screws 6. The spaced frame members of the scale members 1 and 2 are locked and braced in their parallel spaced relation throughout their length by means of a plurality of bolts 7 with lock nuts to prevent the structures from loosening and warping, see Fig. 6, the ends of the scale members 1 and 2 being provided with metal bumpers 8. The strip or tape 3 of each of the scale members 1 and 2 is suitably graduated on one face thereof to present a measuring scale and as herein disclosed the rod when extended is of a five foot length, each foot of the scales graduated into ten units of measurement for purposes of illustration, however, it is to be understood that the foot units may be divided into more or less units of measurement as the system of measurement employed may require, also, that the scale members may be of either an equal or unequal length, or of a more or less greater measurement than herein disclosed.

A shield or covering member 9 preferably made of metal is provided to shield or cover from view approximately the entire length of the scale member 2 when in non-extended position, said shield, see Fig. 5, having an angular strip portion 10 which is adapted to be suitably secured to one of the frame members of the scale member 1. It will be understood that the shield 9 serves to eliminate misreadings and confusion on the part of the surveyor or person using the rod due to the fact that the shield covers from view one of the juxtapositioned scale members when non-extended thereby closing from view the graduations and characters of measurement on the non-extended scale member, which, if not provided, would make it difficult for a surveyor or person using the rod to correctly read the scales of the members 1 and 2 due to their proximity to each other.

The scale members 1 and 2 are guided in their slidable relation with each other by means of guides 11 and 12, the former secured by means of screws 13 or other suitable fastening means, see Fig. 3, to one end of the scale member 2 and adapted to enclose the scale member 1, the guide being provided with a tension spring or clip 14, see Fig. 6, whereby to maintain the scale members and guide in more or less rigid association with each other and also to provide a frictional engagement with one of the scale members to prevent the members from sliding too freely with respect to each other. Said guide is further provided with a sight opening 15 in order that the scale of the scale member 1 may be quickly read regardless of the position the guide may have upon the scale member 1; the latter guide 12 is similarly secured to the opposite end of the scale member 1 and encloses the adjacent end of the scale member 2, said guide being provided with sight openings 16 whereby to enable the reading of the scale of both of the scale members 1 and 2. The guide 12 is provided with a clamping or locking means adapted to lock the scale members 1 and 2 in any desired extended relation with the other, said locking means comprising a hand lock screw 17. A tension spring or clip 18, see Fig. 6 is provided in the guide 12 for the same purposes as is the spring or clip 14 in the guide 11.

It will be readily apparent especially to those skilled in the art of surveying and engineering, that a surveying rod or staff of the character just described greatly diminishes the work and detail usually encountered in surveying work and increases from a standpoint of efficiency the amount of work accomplished and has opened up many new avenues of use of surveying rods due to the new and improved features of said rod. Especially in the surveying of basements, sewers, mine shafts, tunnels and general under ground work has a rod of this character been found most useful and in such use particularly where done in semi or total darkness, it will be understood that the scales of the rod may be quickly and accurately read due to the diaphanous material upon which the scale is applied enabling the projecting of sunlight, if present, or the projection of artificial light upon the rear of the scale material which will be understood to pierce such material throwing the characters and graduations of the scale into relief or outline and enabling the surveyor or leveler to read the scales or rod at a glance without the usual aid of the person holding the rod thereby eliminating the usual exchange and checking of information read and all possibility of mistake in connection therewith.

What I claim is:—

1. A surveying rod comprising open frame members having a strip of diaphanous material therebetween, said strip having a measuring scale thereon.

2. A surveying rod composed of separable open frame members, each said member having a strip of diaphanous material therein and provided with a measuring scale thereon.

3. A surveying rod composed of separable open frame members, each said member having a strip of diaphanous material therein and provided with a measuring scale thereon, and a shield for covering the strip and scale of one of said members when said members are in non-separated position.

4. A surveying rod composed of separable open frame members, means to attach the members in relation to each other as to permit extensibility of said rod, and a diaphanous strip in each member provided with scales adapted for coaction in various positions of the members in relation to each other.

5. A surveying rod composed of separable open frame members, means to attach the members in relation to each other as to permit extensibility of said rod, a diaphanous strip in each member provided with scales adapted for coaction in various positions of the members in relation to each other, and a shield for covering the strip and scale of one of said members when the members are in non-extended position.

6. A surveying rod comprising sections arranged in juxtaposition, guide means carried by said sections permitting a slidable relation to each other, said sections comprising open frame members each provided with a strip of diaphanous material between its members, and each strip having a measuring scale thereon.

7. A surveying rod comprising sections arranged side by side, guide means fixed to one of the sections to permit a slidable relation to the other, a shield member supported by one of the sections adapted for covering the other when in non-extended position, each section comprising open frame members each provided with a strip of diaphanous material between its members and each strip having a measuring scale thereon.

8. A surveying rod comprising sections arranged in juxtaposition, guide means carried by the sections permitting a slidable relation to the other and confining their movement, said sections composed of open frame members having a strip of diaphanous material therein and provided with a measuring scale thereon, and one of said guides provided with a locking means to lock the sections in extended or non-extended position or position intermediate thereof.

In witness whereof, I have hereunto affixed my hand this 14th day of May, 1928.

JOSEPH QUIGLEY.